United States Patent
Yoon et al.

(10) Patent No.: US 12,508,897 B2
(45) Date of Patent: Dec. 30, 2025

(54) VARIABLE GRILLE APPARATUS

(71) Applicants: HYUNDAI MOTOR COMPANY, Seoul (KR); KIA CORPORATION, Seoul (KR); HYUNDAI MOBIS CO., LTD., Seoul (KR)

(72) Inventors: Jin Young Yoon, Gimpo-si (KR); Dong Eun Cha, Hwaseong-si (KR); Hong Heui Lee, Suwon-si (KR); Jae Sup Byun, Seongnam-si (KR); Jang Ho Kim, Seoul (KR)

(73) Assignees: HYUNDAI MOTOR COMPANY, Seoul (KR); KIA CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 299 days.

(21) Appl. No.: 18/218,990

(22) Filed: Jul. 6, 2023

(65) Prior Publication Data
US 2024/0123817 A1  Apr. 18, 2024

(30) Foreign Application Priority Data

Oct. 17, 2022 (KR) .................. 10-2022-0133164

(51) Int. Cl.
*B60K 11/08* (2006.01)
(52) U.S. Cl.
CPC .................. *B60K 11/085* (2013.01)
(58) Field of Classification Search
CPC .................................................. B60K 11/085
See application file for complete search history.

(56) References Cited

U.S. PATENT DOCUMENTS

| | | | | |
|---|---|---|---|---|
| 9,447,719 B2 * | 9/2016 | Kiener | ............ | F28F 27/02 |
| 9,827,847 B1 * | 11/2017 | Hanna | ............ | B60K 11/085 |
| 9,879,589 B2 * | 1/2018 | Charnesky | ............ | B60K 11/085 |
| 9,975,421 B2 * | 5/2018 | Froling | ............ | B60K 11/085 |
| 10,071,625 B1 * | 9/2018 | Stoddard | ............ | B60K 11/085 |
| 10,100,707 B2 * | 10/2018 | Wolf | ............ | B60K 11/085 |
| 10,696,152 B2 * | 6/2020 | Nam | ............ | B60K 11/085 |
| 10,730,384 B1 * | 8/2020 | Klop | ............ | B60K 11/085 |
| 10,773,588 B2 * | 9/2020 | Sinn | ............ | B60K 11/085 |
| 10,900,409 B2 * | 1/2021 | Clapie | ............ | F01P 3/18 |
| 11,370,295 B2 * | 6/2022 | Schneider | ............ | B60K 11/04 |
| 11,639,099 B2 * | 5/2023 | Byun | ............ | B60K 11/085 180/68.1 |
| 11,731,503 B2 * | 8/2023 | Guyon | ............ | B60K 11/085 180/68.1 |
| 11,813,937 B2 * | 11/2023 | Sui | ............ | B60K 11/085 |
| 11,891,125 B2 * | 2/2024 | Byun | ............ | B60K 11/085 |

(Continued)

FOREIGN PATENT DOCUMENTS

KR       19990024905 U     7/1999

*Primary Examiner* — Jeffrey J Restifo
(74) *Attorney, Agent, or Firm* — Lempia Summerfield Katz LLC

(57) ABSTRACT

A variable grille apparatus controls a flow rate of air circulated through the grille. Commercial properties are improved through an advanced opening and closing operation during adjustment of the air flow rate. The opening and closing operation of the grille is diversified, such as by sequential or simultaneous operation, so that the sense of operation is enhanced, an exterior design is diversified, and the air flow is secured through an optimization of the structural arrangement.

16 Claims, 12 Drawing Sheets

(56) References Cited

U.S. PATENT DOCUMENTS

| | | | | |
|---|---|---|---|---|
| 11,987,116 | B2* | 5/2024 | Müller | B60R 19/52 |
| 12,151,550 | B2* | 11/2024 | Takita | B60K 11/085 |
| 12,280,654 | B2* | 4/2025 | Manhire | B60K 11/04 |
| 12,304,571 | B2* | 5/2025 | Byun | B62D 35/005 |
| 12,337,677 | B2* | 6/2025 | Harter | B60K 11/085 |
| 2019/0001810 | A1* | 1/2019 | Fujitani | B60K 11/085 |
| 2023/0080238 | A1* | 3/2023 | Byun | B60K 11/085 180/68.1 |
| 2023/0249540 | A1* | 8/2023 | Harter | B60K 11/085 165/96 |
| 2024/0051620 | A1* | 2/2024 | Jeong | B62D 35/005 |
| 2024/0123817 | A1* | 4/2024 | Yoon | B60K 11/085 |
| 2024/0131922 | A1* | 4/2024 | Yoon | F01P 7/10 |
| 2024/0174076 | A1* | 5/2024 | Yoon | B60K 11/085 |
| 2024/0399857 | A1* | 12/2024 | Yoon | B60K 11/085 |
| 2025/0121676 | A1* | 4/2025 | Manhire | B60K 11/085 |
| 2025/0196618 | A1* | 6/2025 | Yoon | B60Q 1/28 |

* cited by examiner

VARIABLE GRILLE APPARATUS

CROSS REFERENCE TO RELATED APPLICATION

The present application claims priority to Korean Patent Application No. 10-2022-0133164, filed on Oct. 17, 2022, the entire contents of which are incorporated herein for all purposes by this reference.

BACKGROUND

Field of the Disclosure

The present disclosure relates to a variable grille apparatus wherein a flow rate of air circulated through the grille is controlled and commercial properties are improved through an advanced opening and closing operation during adjustment of the air flow rate.

Description of the Related Art

In general, a vehicle (e.g., a mobility) requires cooling of driving system components and cooling system components. Therefore, a grille is provided in the front part of the vehicle so that air can circulate for cooling the driving system components and cooling system components. In other words, as a vehicle is driven, air flows through the grille and passed through the driving system components and cooling system components, cooling each component through heat exchange with air, i.e. convection.

Nevertheless, the driving system components and cooling system components can be driven optimally only when they reach a temperature within a certain range. However, since the grille of the vehicle is configured to be opened all the time, the driving system components and cooling system components constantly exchange heat with the outside air. In other words, the inflow of air may adversely affect aerodynamics and fuel efficiency improvement until the temperature of the driving system components rises within a predetermined range during initial start-up. In addition, during high-speed driving of a vehicle, the flow rate of air according to the driving wind or air flow is excessively increased, which may cause a decrease in fuel efficiency due to an increase in air resistance.

In an effort to solve the problems above, recent vehicles are equipped with an active air flap. Such an active air flap is installed on the grille and is configured to be opened and closed so that, when it is closed, air inflow is blocked and when, it is opened, air flows through the grille.

However, the conventional active air flap is configured such that a plurality of louvers is rotated by a complex link structure. Accordingly, the structure of the active air flap is complicated, weight is increased, and a larger motor for operating the plurality of door and link structures is needed.

In addition, the conventional active air flap serves only to selectively control the flow of air.

The foregoing is intended merely to aid in understanding the background of the present disclosure. The foregoing is not intended to mean that the present disclosure falls within the purview of the related art that is already known to those having ordinary skill in the art.

SUMMARY

The present disclosure has been made in an effort to solve the above problems. An objective of the present disclosure is to provide a variable grille apparatus wherein a flow rate of air circulated through the grille is controlled. Furthermore, commercial properties are improved through an advanced opening and closing operation during the air flow rate adjusting.

To achieve the purposes above, the variable grille apparatus includes a housing with an open space, a flap, and a drive unit. The flap is movably mounted to the housing and is configured to tilt relative to the housing to open and close the open space of the housing according to a tilting position. The drive unit has a connecting link connected to the flap, a rotating plate to which the connecting link is connected, and a driving motor for providing rotational power to the rotating plate. A guide part is provided on the rotating plate and is configured to guide movement of the connecting link during a rotation of the rotating plate. The drive unit is configured to move a position of the flap when the connecting link moves rectilinearly along the guide part during the rotation of the rotating plate.

In an embodiment, the flap is mounted to the housing via a movable shaft. Guide holes are provided at upper and lower ends of the housing, respectively, thus allowing opposite ends of the movable shaft to be mounted thereto, respectively. The guide holes are configured to provide a moving path for, or define a movement path of, the movable shaft.

In an embodiment, the upper end of the housing is provided with a first support portion and a first connection portion that is disposed above the first support portion. The guide holes provided at the upper end of the housing include a first support hole extending from the first support portion in a front-rear direction and include a first tilting guide hole extending from the first connection portion. The first tilting guide hole has a bend in the front-rear direction In an embodiment, a first movable part and a first tilting guide part are provided at the upper end of the movable shaft. The first movable part is movably inserted into the first support hole and the first tilting guide part has a backward bend from the first movable part and is movably inserted into the first tilting guide hole.

In an embodiment, the lower end of the housing is provided with a second support portion and a second connection portion that is disposed below the second support portion. The guide holes provided at the lower end of the housing include a second support hole extending from the second support portion in a front-rear direction and a second tilting guide hole extending from the second connection portion while being bent in the front-rear direction.

In an embodiment, a second movable part and a second tilting guide part are provided at the lower end of the movable shaft. The second movable part is movably inserted into the second support hole and the second tilting guide part has a backward bend from the second movable part and is movably inserted into the second tilting guide hole.

In an embodiment, the housing is provided with a mounting portion crossing the open space and the drive unit is provided on the mounting portion.

In an embodiment, the housing is provided with a plurality of support ribs that extend in vertical directions and connect to the mounting portion.

In an embodiment, the plurality of support ribs includes a plurality of main ribs connected to upper and lower ends of the mounting portion and includes a plurality of auxiliary ribs connected to the upper end of the mounting portion and arranged along a longitudinal direction of the mounting portion.

In an embodiment, the drive unit further includes a rotating shaft rotatably mounted to the mounting portion and coupled to the rotating plate. The rotating shaft is rotated by the rotational power received from the driving motor.

In an embodiment, the mounting portion includes a seating part on which the rotating plate is rotatably mounted. The connecting link is inserted into the seating part thus guiding the rectilinear movement of the connecting link.

In an embodiment, the connecting link is provided with a reinforcing rib at a part that is inserted into the seating part. The seating part is provided with an extended reinforcing groove that is configured to allow the reinforcing rib to be inserted therein and moved rectilinearly therealong.

In an embodiment, the mounting portion is provided with a cover portion configured to cover the rotating plate of the drive unit.

In an embodiment, the rotating plate of the drive unit is positioned to match the flap in a front-rear direction when tilting so that the flap is opened.

In an embodiment, the guide part includes a groove extending from an outside to an inside along a rotational direction of the rotating plate. The connecting link includes a protrusion that is inserted into the guide part and moves along the guide part.

In an embodiment, an outermost portion of the guide part that is positioned at the rotating plate is open to the outside.

In an embodiment, the flap, the connecting link, and the rotating plate include a plurality of flaps, a plurality of connecting links, and a plurality of rotating plates, respectively. The flaps, the connecting links, and the rotating plates are arranged laterally in the open space of the housing. Each of the flaps is configured such that rhombus-shaped panels are arranged in a vertical direction, and the panels of different flaps are arranged to partially overlap in the vertical direction.

In an embodiment, the variable grille apparatus having the above-mentioned structure as described above is capable of controlling the flow rate of air circulated through the grille. Additionally, the variable grille apparatus is capable of improving commercial properties through the advanced opening and closing operation during adjustment of the air flow rate.

In addition, the opening and closing operation of the grille is diversified, such as by sequential or simultaneous operation, so that the sense of operation is enhanced, an exterior design is diversified, and the air flow is secured through an optimization of the structural arrangement.

BRIEF DESCRIPTION OF THE DRAWINGS

The above and other objectives, features, and other advantages of the present disclosure should be more clearly understood from the following detailed description taken in conjunction with the accompanying drawings, in which.

DETAILED DESCRIPTION

Figure 1:
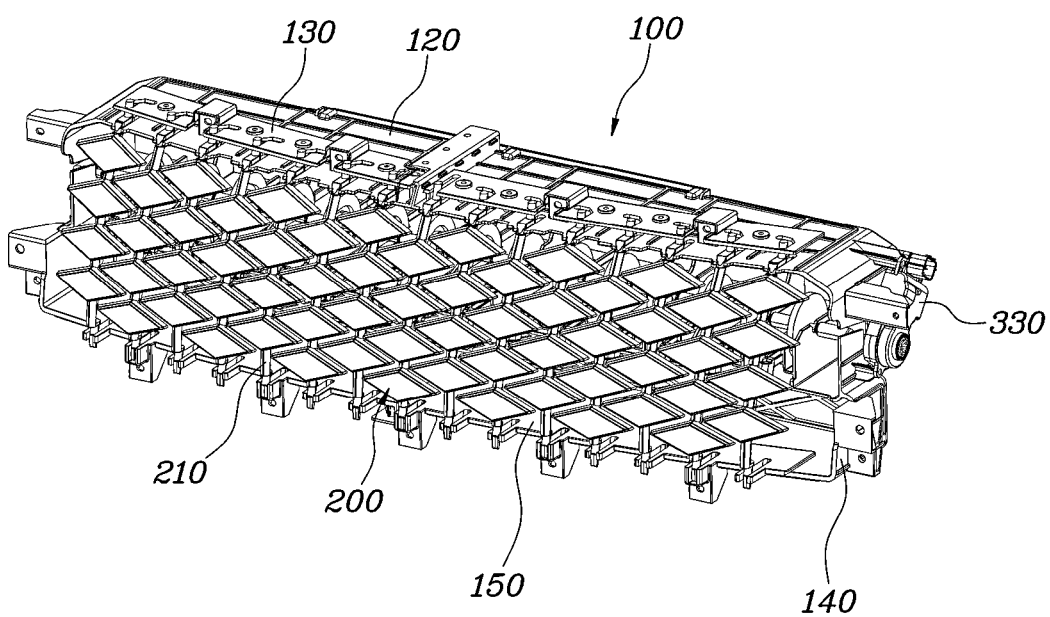
FIG. 1 is a view illustrating a variable grille apparatus according to an embodiment of the present disclosure.

Hereinafter, embodiments disclosed in the present specification are described in detail with reference to the accompanying drawings. The same or similar components are assigned the same reference numbers regardless of which drawing illustrates the components, and redundant description thereof has been omitted.

The terms "module" and "part" for the components used in the following description are given or interchanged in consideration of only the ease of writing the specification, and do not have distinct meanings or functions by themselves.

Further, where it has been determined that the detailed description of the known art related to the present disclosure might obscure the gist of the present disclosure, the detailed description thereof has been omitted. In addition, the accompanying drawings are only to help understand the embodiments disclosed in the present specification. Thus, the technical spirit of the inventive concepts disclosed herein is not limited by the accompanying drawings. All variations included in the spirit and scope of the present inventive concept should be understood to include equivalents or substitutes.

Terms such as 'first' and 'second' may be used for explaining various constitutive elements, but the constitutive elements should not be limited by these terms. In other words, the terms are merely used to distinguish one component from another component.

It should be understood that when any element is referred to as being "connected" or "coupled" to another element, one element may be directly connected or coupled to the other element, or an intervening element may be present therebetween. In contrast, it should be understood that when an element is referred to as being "directly coupled" or "directly connected" to another element, there are no intervening elements present.

As used herein, the singular forms are intended to include the plural forms as well, unless the context clearly indicates otherwise.

It should be further understood that the terms "comprises," "includes," or "has" when used in this specification specify the presence of stated features, regions, integers, steps, operations, elements, and/or components. However, such terms do not preclude the presence or addition of one or more other features, regions, integers, steps, operations, elements, components, and/or combinations thereof.

In addition, a unit or control unit included in names such as a motor control unit (MCU), a hybrid control unit (HCU), and the like is a control device that controls a specific vehicle function. It is only a term widely used in the naming of an element and does not mean a generic function unit. When a component, device, element, or the like of the present disclosure is described as having a purpose or performing an operation, function, or the like, the component, device, or element should be considered herein as being "configured to" meet that purpose or to perform that operation or function.

Herein below, a variable grille apparatus according to embodiments of the present disclosure is described with reference to the accompanying drawings.

Figure 2:
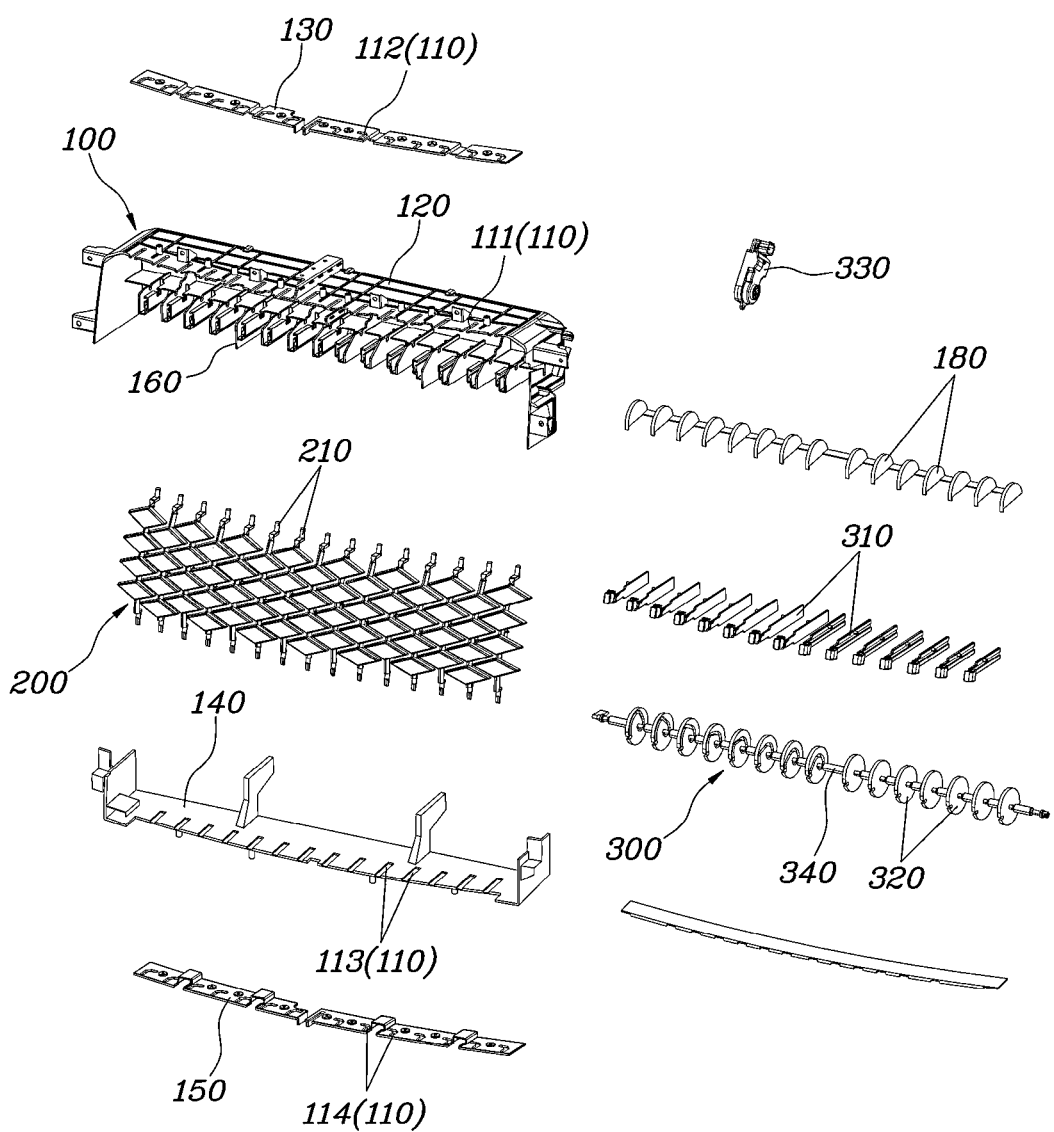
FIG. 2 is an exploded view of the variable grille apparatus illustrated in FIG. 1.
Figure 3:
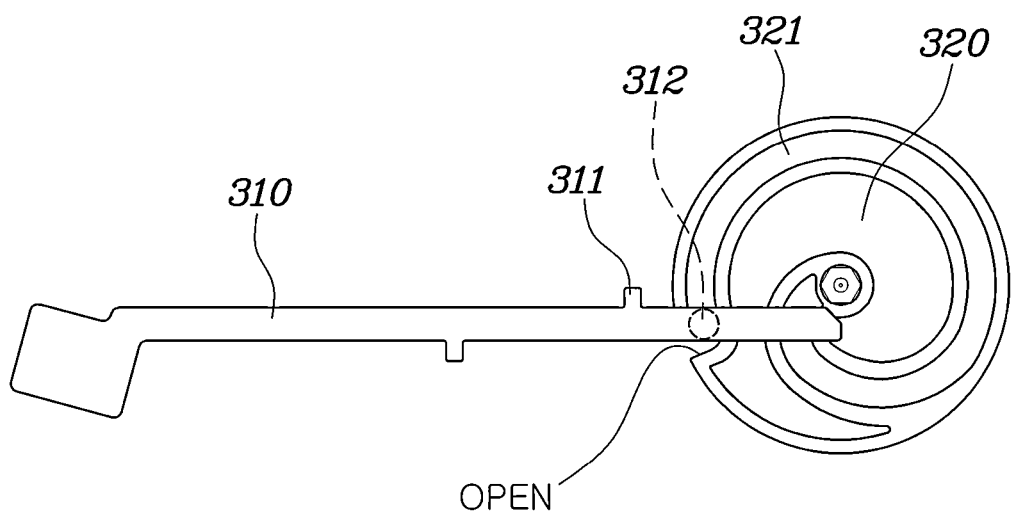
FIG. 3 is a view illustrating a connecting link and a rotating plate of the variable grille apparatus illustrated in FIG. 1.
Figure 4:
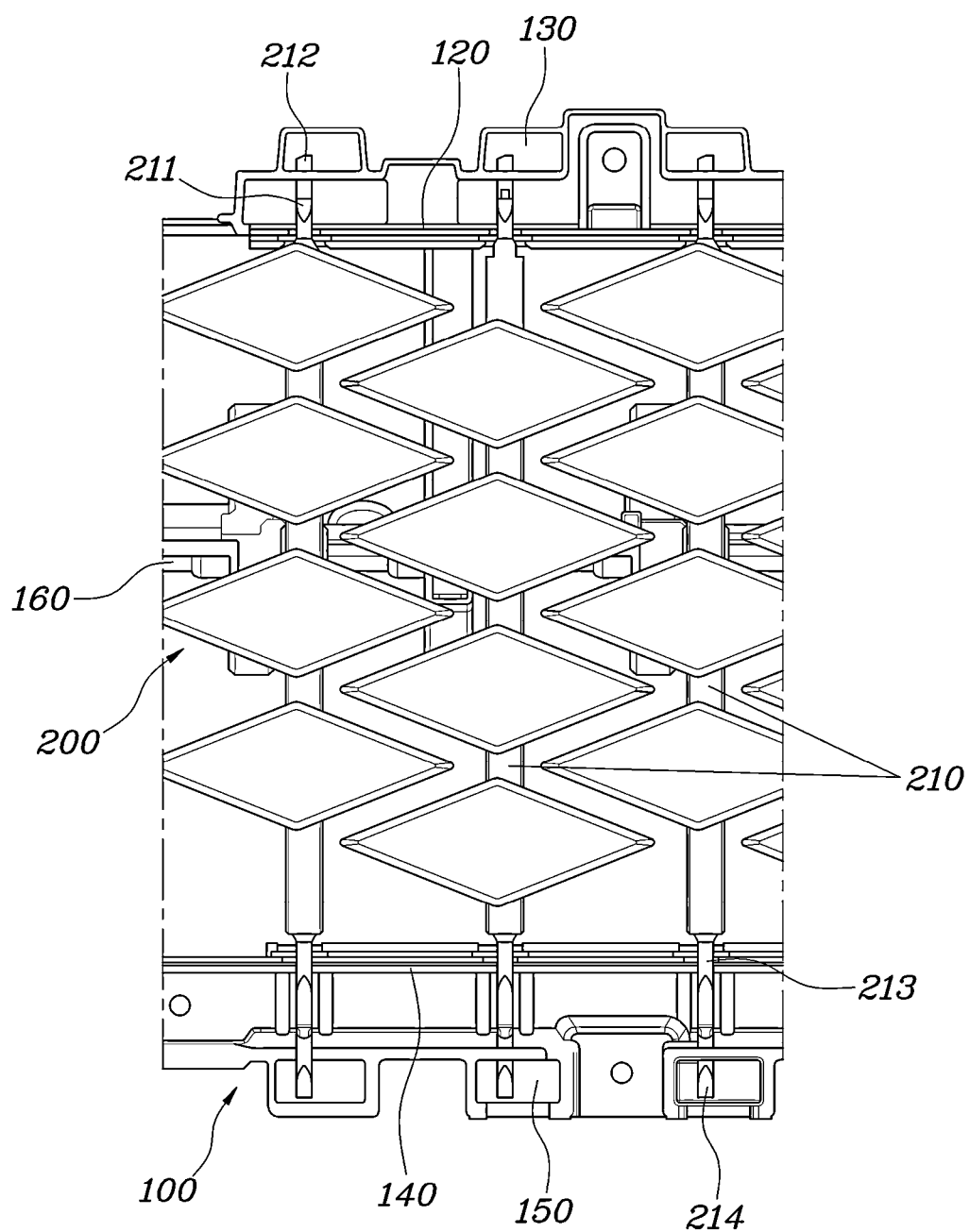
FIG. 4 is a view illustrating a flap of the variable grille apparatus illustrated in FIG. 1.

FIG. 1 is a view illustrating a variable grille apparatus according to an embodiment of the present disclosure. FIG. 2 is an exploded view of the variable grille apparatus illustrated in FIG. 1. FIG. 3 is a view illustrating a connecting link and a rotating plate of the variable grille apparatus illustrated in FIG. 1. FIG. 4 is a view illustrating a flap of the variable grille apparatus illustrated in FIG. 1.

Figure 5:
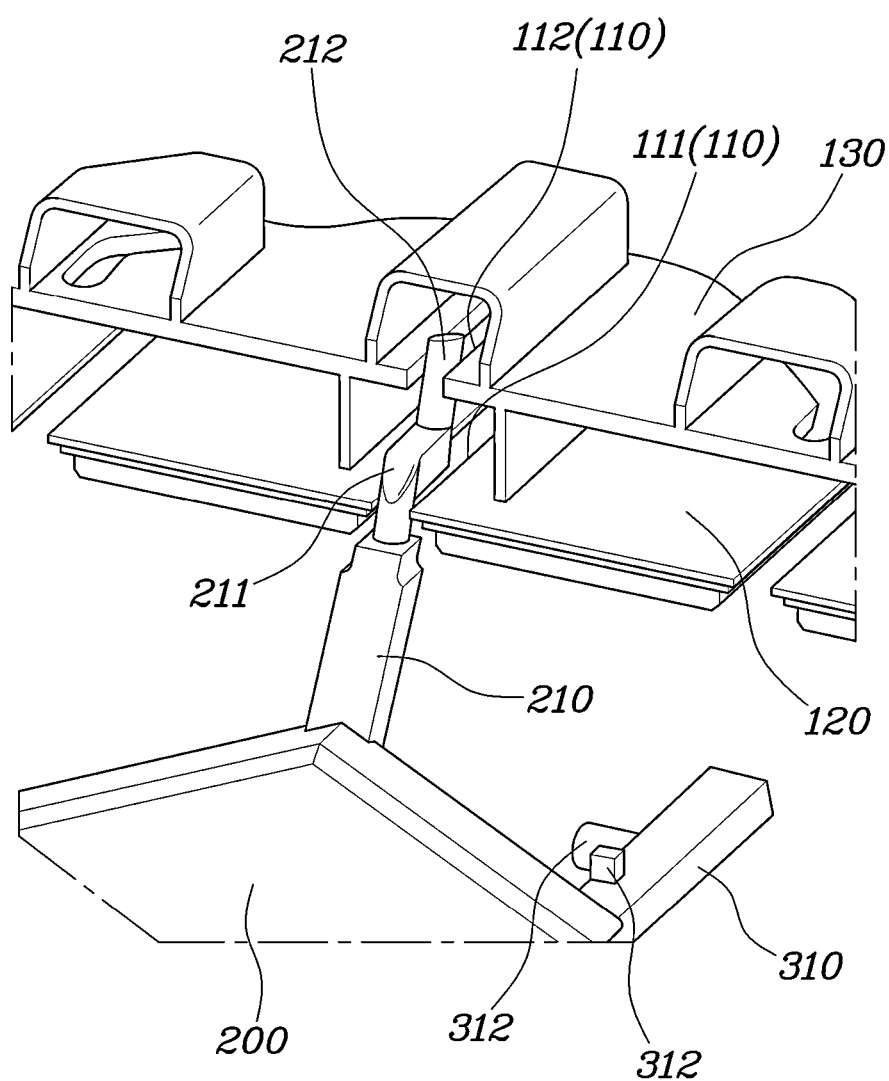
FIG. 5 is a view illustrating a connection between the flap and an upper end of a housing of the variable grille apparatus illustrated in FIG. 1.
Figure 6:
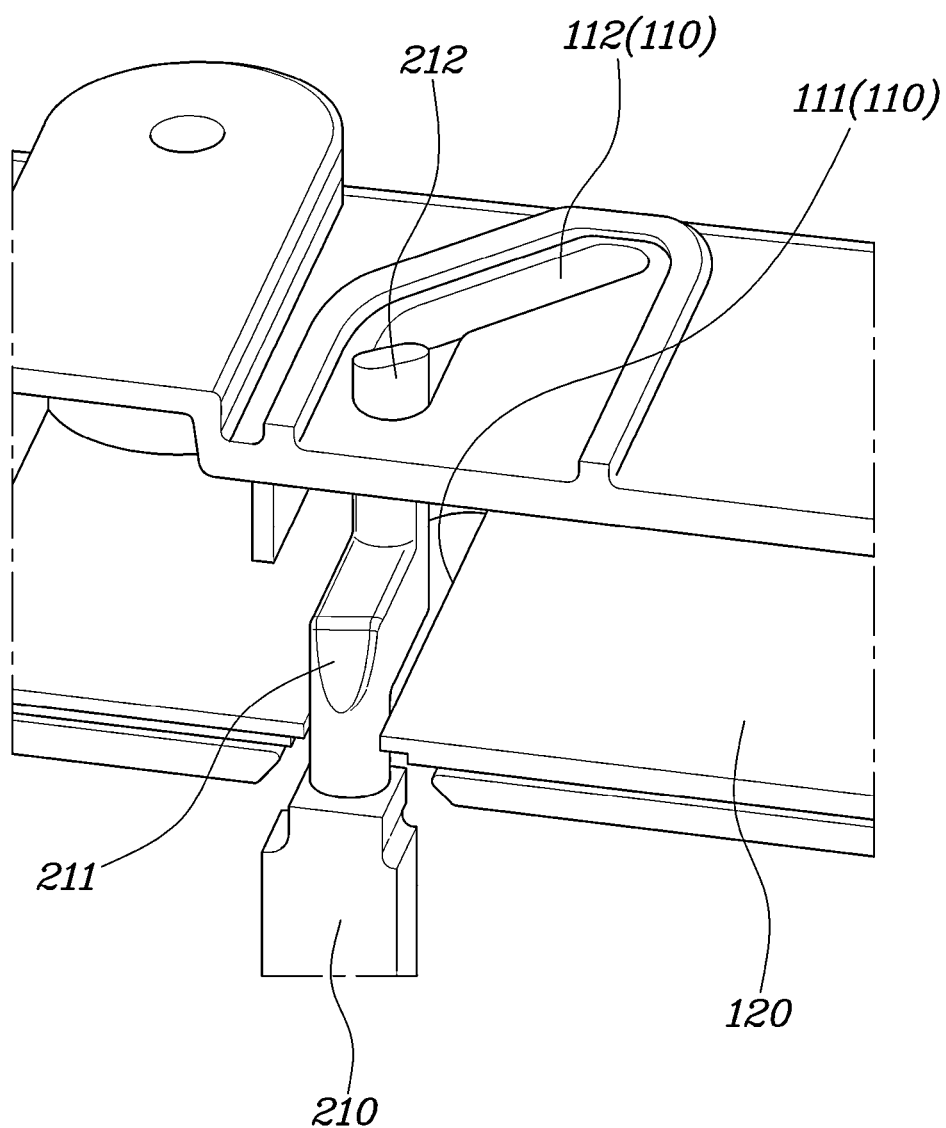
FIG. 6 is a view illustrating a guide hole of the variable grille apparatus illustrated in FIG. 1.
Figure 7:
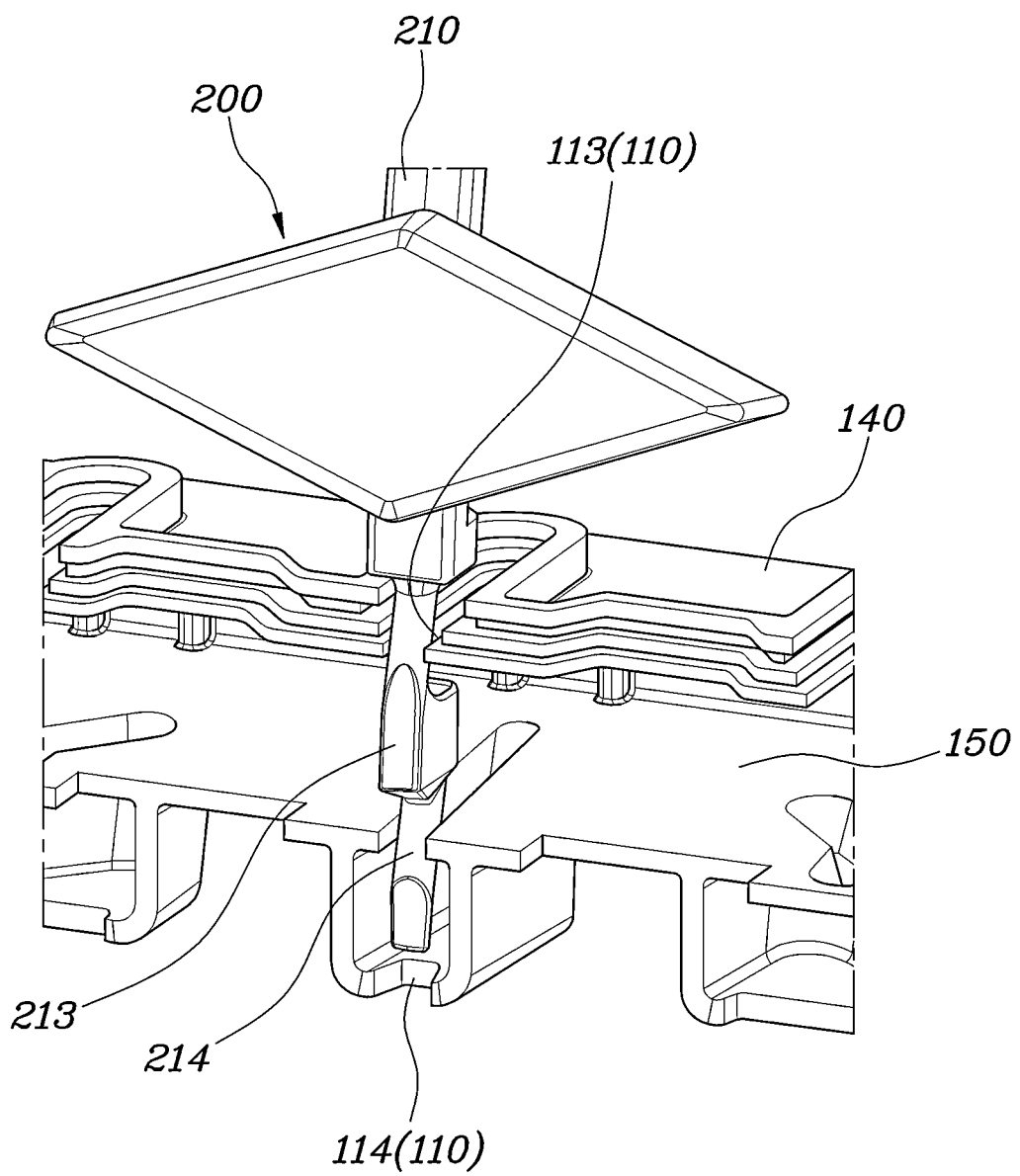
FIG. 7 is a view illustrating a connection between the flap and a lower end of the housing of the variable grille apparatus illustrated in FIG. 1.
Figure 8:
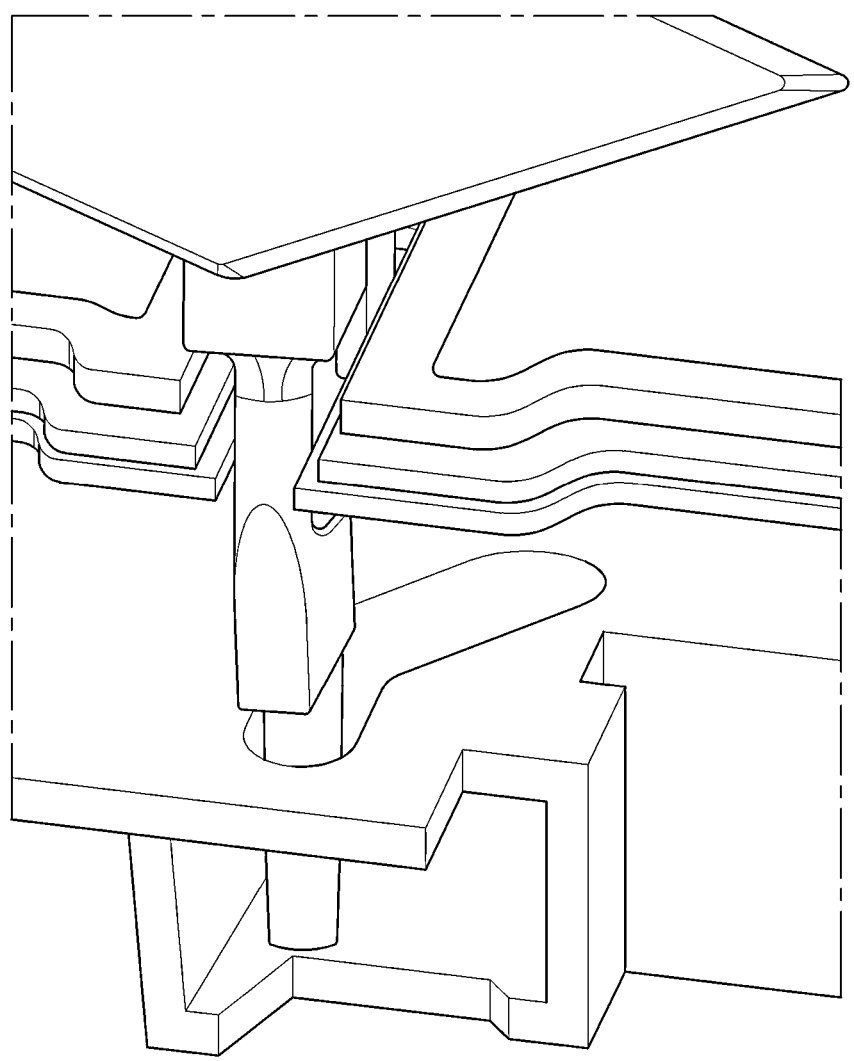
FIG. 8 is a view illustrating the guide hole of the variable grille apparatus illustrated in FIG. 1.

FIG. 5 is a view illustrating a connection between the flap and an upper end of a housing of the variable grille apparatus illustrated in FIG. 1. FIG. 6 is a view illustrating a guide hole of the variable grille apparatus illustrated in FIG. 1. FIG. 7 is a view illustrating a connection between the flap and a lower end of the housing of the variable grille apparatus illustrated in FIG. 1. FIG. 8 is a view illustrating a guide hole of the variable grille apparatus illustrated in FIG. 1.

Figure 9:
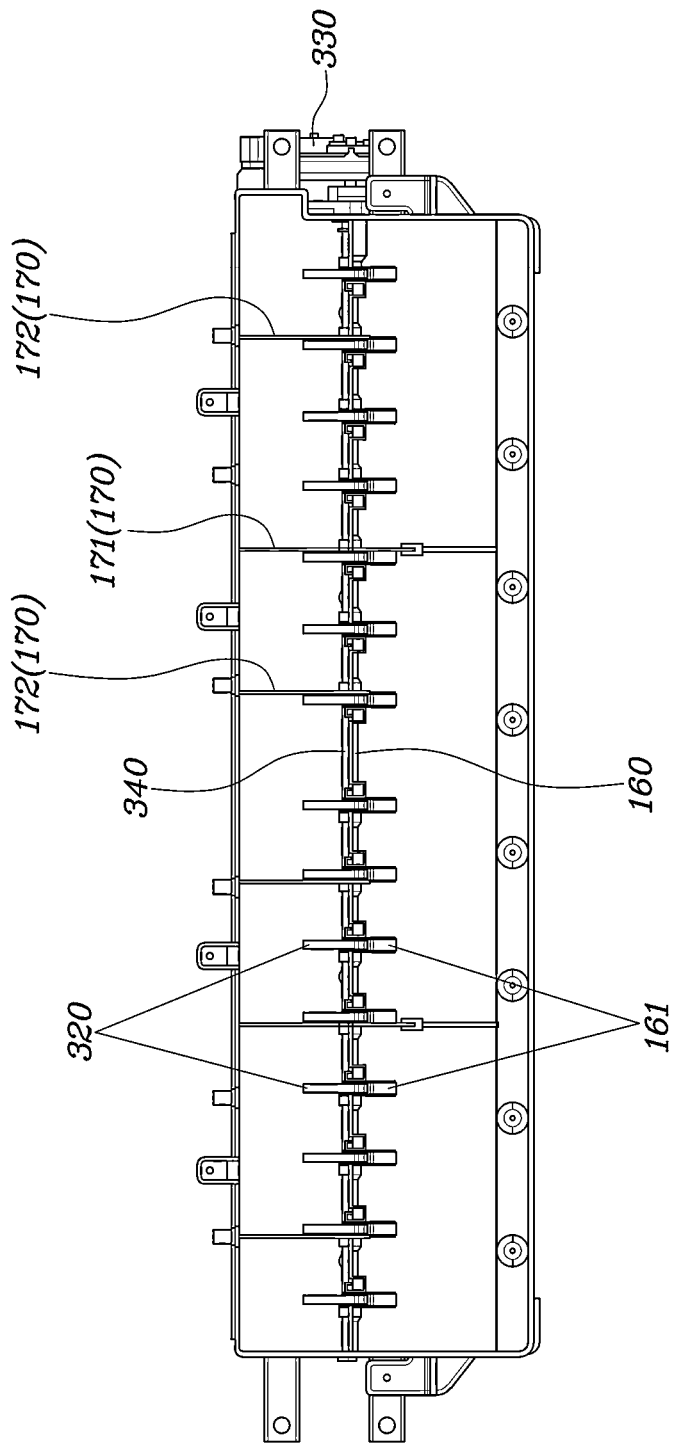
FIG. 9 is a view illustrating the housing and a drive unit of a mounting portion of the variable grille apparatus illustrated in FIG. 1.
Figure 10:
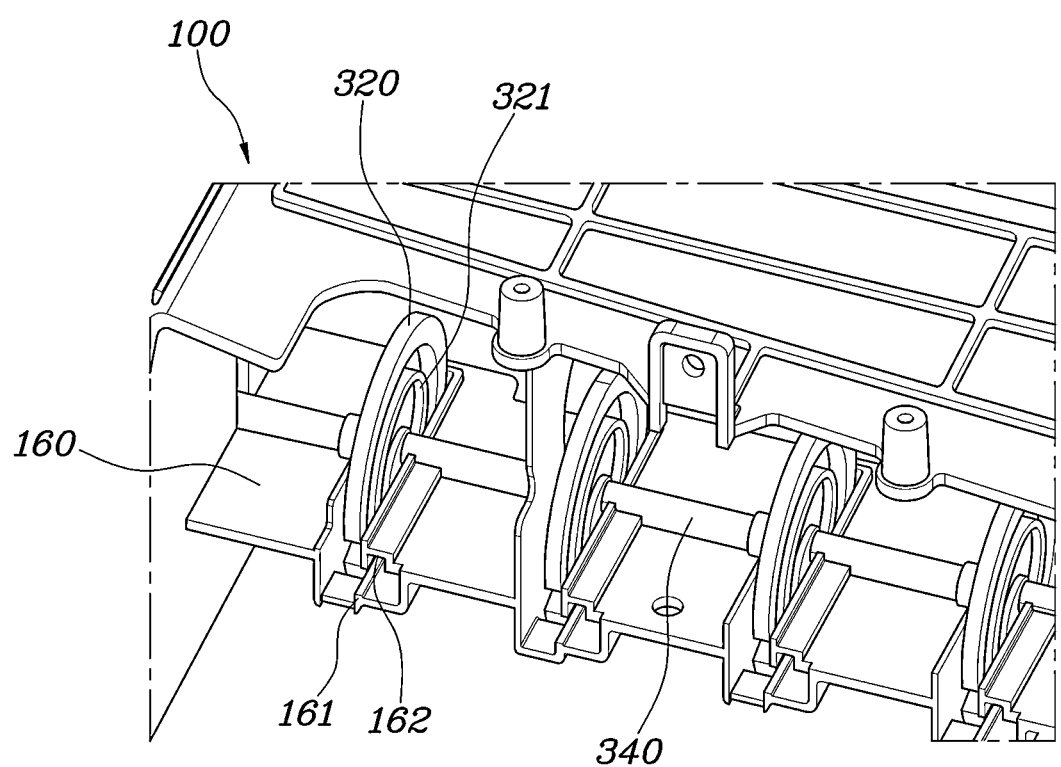
FIG. 10 is a view illustrating the drive unit and the mounting portion of the variable grille apparatus illustrated in FIG. 1.
Figure 11:
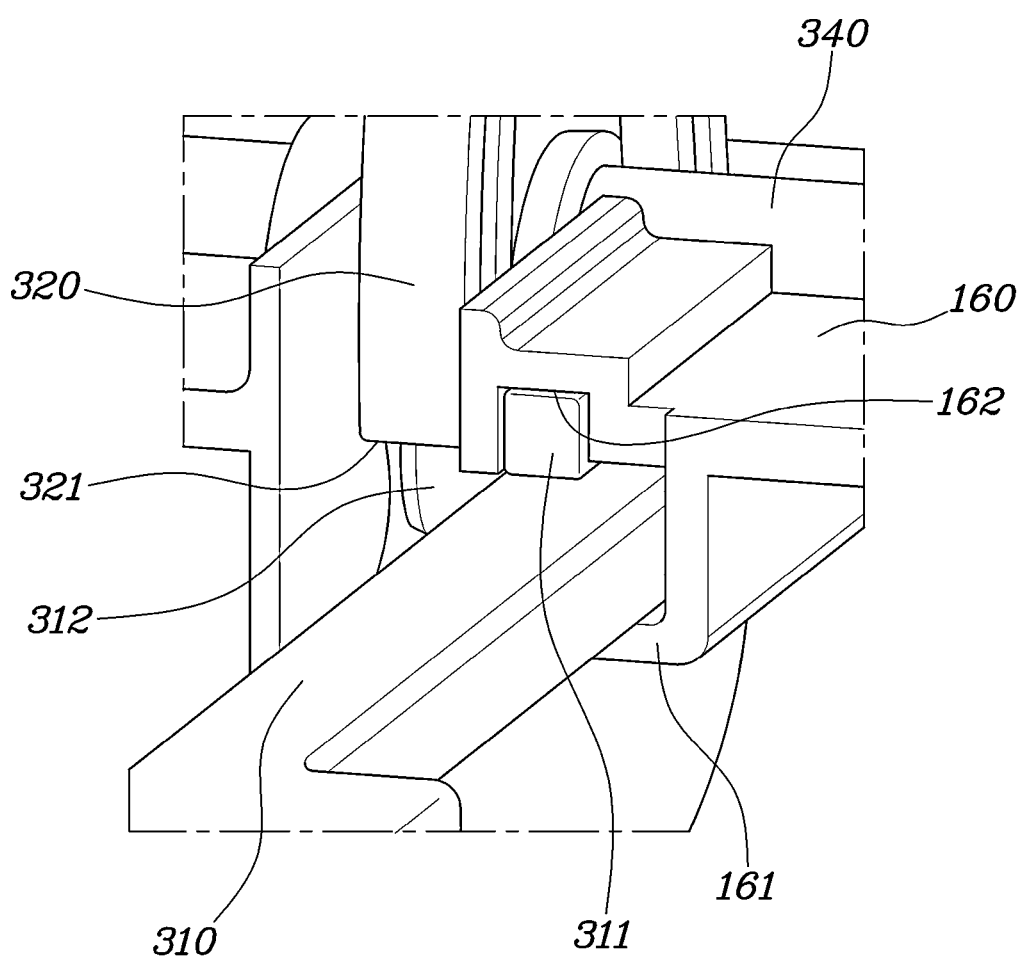
FIG. 11 is a view illustrating the connecting link and the rotating plate provided on the mounting portion of the variable grille apparatus illustrated in FIG. 1.
Figure 12:
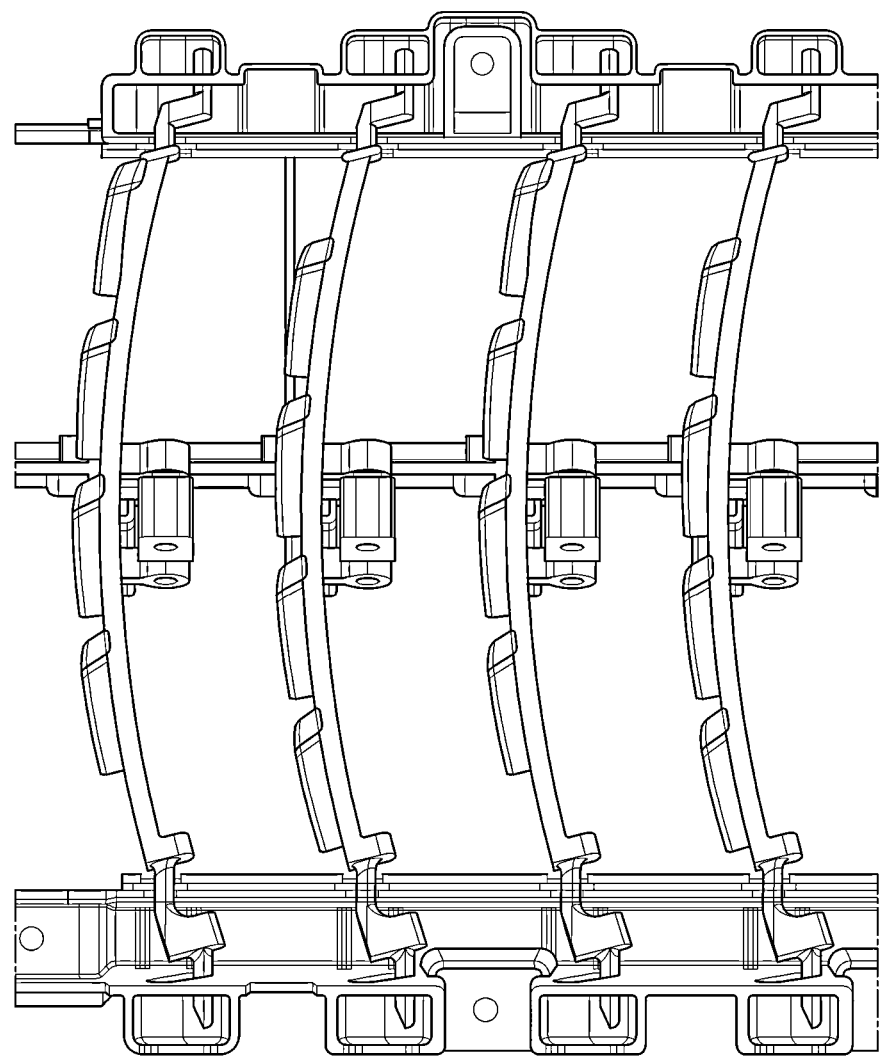
FIG. 12 is a view illustrating an opened state of the flap of the variable grille apparatus illustrated in FIG. 1.

FIG. 9 is a view illustrating the housing and a drive unit of a mounting portion of the variable grille apparatus illustrated in FIG. 1. FIG. 10 is a view illustrating the drive unit and the mounting portion of the variable grille apparatus illustrated in FIG. 1. FIG. 11 is a view illustrating the connecting link and the rotating plate provided on the mounting portion of the variable grille apparatus illustrated in FIG. 1. FIG. 12 is a view illustrating an opened state of the flap of the variable grille apparatus illustrated in FIG. 1.

As shown in FIGS. 1 and 2, the variable grille apparatus according to the present disclosure includes a housing 100 with an open space and a flap 200. The flap 200 is movably mounted to the housing 100 and is configured to tilt when moving relative to the housing 100 to open and close the open space of the housing 100 according to a tilting position. The variable grille apparatus also includes a drive unit 300 having a connecting link 310 connected to the flap 200, a rotating plate 320 to which the connecting link 310 is connected, and a driving motor 330. The driving motor 330 is for providing rotational power to the rotating plate 320. A guide part 321 is provided on the rotating plate 320 and is configured to guide movement of the connecting link 310 during a rotation of the rotating plate 320. Thus, the drive unit 300 is configured to move a position of the flap 200 when the connecting link 310 moves rectilinearly along the guide part 321 during the rotation of the rotating plate 320.

The housing 100 is installed on a front portion of a vehicle and may be installed on a grille. The open space of the housing 100 allows air to flow so that the driving system components or the electrical system components can be cooled.

The flap 200 is movably and rotatably installed in the housing 100. The flap 200 is positioned and configured to close the open space and configured to open the open space while being rotated when moving in the housing 100.

The flap 200 may be opened and closed by the drive unit 300. The drive unit 300 includes the connecting link 310, the rotating plate 320, and the driving motor 330. The rotating plate 320 is rotated when the driving motor 330 is operated. The opening and closing position of the flap 200 can be adjusted as the flap 200, which is connected to the rotating plate 320 via the connecting link 310, is linearly moved in accordance with the rotational movement of the rotating plate 320. The driving motor 330 may be operated by receiving a control command through a motor controller.

In other words, the flap 200 and the rotating plate 320 are connected via the connecting link 310. Furthermore, a guide part 321 for inducing movement of the connecting link 310 is provided in the rotating plate 320 so that, when the rotating plate 320 rotates, the connecting link 310 moves along a shape of the guide part 321. The flap 200 may thereby be rectilinearly moved in accordance with the rotation of the rotating plate 320.

The guide part 321 of the rotating plate 320 may include a groove extending from an outside to an inside along a rotational direction of the rotating plate 320. The connecting link 310 may include a protrusion 312 that is inserted into the guide part 321 and moves along the guide part 321.

As such, the guide part 321 of the rotating plate 320 is configured in a groove shape. The protrusion 312, configured to be inserted into the guide part 321, is provided at the connecting link 310. The connecting link 310 may thereby be connected to the rotating plate 320 to move along the groove of the guide part 321.

In particular, as shown in FIG. 3, the guide part 321 is configured to extend along the rotational direction from the rotating plate 320 while being rotated from the outside to the inside toward the center. Thereby, when the rotating plate 320 is rotated, the connecting link 310 moves from the outside to the inside of the rotating plate 320 along the extended form of the guide part 321. In other words, the connecting link 310 is linearly moved by the rotational movement of the rotating plate 320, and the flap 200 that is connected to the connecting link 310 may be pulled backward or pushed forward. Thereby, the flap 200 may be pulled back to open the open space or may be pushed forward to close the open space depending on the rotational position of the rotating plate 320.

In addition, an outermost portion of the guide part 321, positioned at the rotating plate 320, may be open to the outside. Thus, when the connecting link 310 is connected to the rotating plate 320, the protrusion 312 enters the guide part 321 through the open part in the rotating plate 320. Furthermore, when the rotating plate 320 rotates, the protrusion 312 is positioned to be wrapped (e.g., guided) around the guide part 321. Due to this, it is easy to connect the connecting link 310 to the rotating plate 320. Additionally, the linear movement of the connecting link 310 may be performed in accordance with the rotational movement of the rotating plate 320 while the rotating plate 320 is in a state in which the protrusion 312 of the connecting link 310 is connected to the guide part 321 of the rotating plate 320.

As described above, in the present disclosure, when the driving motor 330 of the drive unit 300 is operated, the rotating plate 320 is rotated by receiving rotational power. Furthermore, as the connecting link 310, which is connected to the rotating plate 320, is moved along the guide part 321, the connecting link 310 is linearly moved by the rotational movement of the rotating plate 320. Thereby, when the connecting link 310 is moved in the front-rear direction, the flap 200 is moved in accordance with the connecting link 310 and is tilted simultaneously to open and close the open space of the housing 100.

In an embodiment, the flap 200 may include a plurality of flaps, the connecting link 310 may include a plurality of connecting links, and the rotating plate 320 may include a plurality of rotating plates, respectively. The flaps 200, the connecting links 310, and the rotating plates 320 are arranged laterally in the open space of the housing.

Each of the flaps 200 is configured such that rhombus-shaped panels are arranged in a vertical direction, and the panels of different flaps 200 may be arranged to partially overlap in the vertical direction.

In other words, since a plurality of flaps 200 may be utilized, the connecting link 310 and the rotating plate 320 connected to the flap 200 may also be provided in a plurality.

Herein, each of the flaps 200 is formed in a rhombus-shape and is configured to be arranged laterally in the open space of the housing 100. The different flaps 200 may be arranged to partially overlap each other. Thereby, when the flaps 200 are arranged to close the open space, each flap 200 can close the open space smoothly. When the flaps 200 are arranged to open the open space, each flap 200 may open the open space while rotating by 90°. The plurality of flaps 200 may be opened and closed simultaneously or may be sequentially opened and closed. Furthermore, the shape and number of the flaps 200 may be variously changed according to the design of the grille.

As shown in FIG. 4, the flap 200 may be mounted to the housing 100 via a movable shaft 210. Guide holes 110 are provided at upper and lower ends of the housing 100, respectively, thus allowing opposite ends of the movable shaft 210 to be mounted thereto, respectively. The guide holes 110 are configured to provide a moving path for, or to define a movement path of, the movable shaft 210.

In the present disclosure, as shown in FIG. 2, the housing 100 may be configured to have the upper and lower ends separated. Additionally, the single housing 100 may be configured by assembling the upper end and the lower end.

The flap 200 is provided with the movable shaft 210, and the movable shaft 210 is movably connected along the guide hole 110 formed at the upper and lower ends of the housing 100. Since the guide hole 110 forms a moving path for the movable shaft 210, the movable shaft 210 may be moved along the guide hole 110 or may be tilted.

In the present disclosure, the plurality of flaps 200 are mounted along the longitudinal direction on one movable shaft 210, and the connecting link 310 is rotatably connected to the movable shaft 210 in a hinge structure. Thus, the movable shaft 210 may be moved forward and backward together with the connecting link 310 or may be tilted by the moving path of the guide hole 110.

In detail, as shown in FIGS. 4-8, the upper end of the housing 100 is provided with a first support portion 120 and a first connection portion 130 that is disposed above the first support portion 120. The guide hole 110, provided at the upper end of the housing 100, includes a first support hole 111 extending from the first support portion 120 in a front-rear direction and includes a first tilting guide hole 112 extending from the first connection portion 130. The first tilting guide hole 112 has a bend in the front-rear direction.

In addition, a first movable part 211 and a first tilting guide part 212 are provided at the upper end of the movable shaft 210. The first movable part 211 is movably inserted into the first support hole 111, and the first tilting guide part 212 has a backward bend from, or is positioned offset relative to, the first movable part 211 and movably inserted into the first tilting guide hole 112.

In other words, the upper end of the housing 100 may have a multi-layered structure and may include the first support portion 120 and the first connection portion 130. In addition, the first support hole 111, inducing the rectilinear movement of the movable shaft 210, extends from the first support portion 120 in a front-rear direction. Additionally, the first tilting guide hole 112, inducing the linear movement of the movable shaft 210, extends from the first connection portion 130 and has a bend in the front-rear direction.

As such, the first movable part 211 is movably inserted into the first support hole 111 so that the axis of the movable shaft 210 is prevented from being twisted and the linear motion is stabilized.

In particular, the first tilting guide part 212 has a backward bend from, or is positioned offset or rearward relative to, the first movable part 211 and is movably inserted into the first tilting guide hole 112. Thus, when the first tilting guide part 212 moves along the first tilting guide hole 112, the tilting operation of the first movable part 211 is performed by the bend, i.e., curved shape, of the first tilting guide hole 112. In other words, the first tilting guide part 212 of the movable shaft 210 has a backward bend or is positioned offset relative to and extends from the first movable part 211. Furthermore, when the first movable part 211 moves in the first support hole 111, the first tilting guide part 212 may be moved along the first tilting guide hole 112 while the first movable part 211 may be rotated on its axis.

The lower end of the housing 100 is provided with a second support portion 140 and a second connection portion 150 that is disposed below the second support portion 140. The guide hole 110, provided at the lower end of the housing 100, includes a second support hole 113 extending from the second support portion 140 in a front-rear direction and a second tilting guide hole 114 extending from the second connection portion 150. The second tilting guide holes also has a bend in the front-rear direction.

In addition, a second movable part 213 and a second tilting guide part 214 are provided at the lower end of the movable shaft 210. The second movable part 213 is movably inserted into the second support hole 113, and the second tilting guide part 214 has a backward bend from, or is positioned rearward or offset relative to, the second movable part 213 and is movably inserted into the second tilting guide hole 114.

In other words, the lower end of the housing 100 may have a multi-layered structure and include the second support portion 140 and the second connection portion 150. In addition, the second support hole 113, inducing the rectilinear movement of the movable shaft 210, extends from the second support portion 140 in the front-rear direction. The second tilting guide hole 114, inducing the linear movement of the movable shaft 210, extends from the second connection portion 150 and has the bend in the front-rear direction.

Thereby, the second movable part 213 is movably inserted into the second support hole 113 so that the axis of the movable shaft 210 is prevented from being twisted and the linear motion is stabilized. Since the second tilting guide part 214 has a backward bend from, or is positioned offset or rearward relative to, the second movable part 213 and is movably inserted into the second tilting guide hole 114, the second tilting guide part 214 moves along the second tilting guide hole 114. Thus, the tilting operation of the second movable part 213 is performed by the bend, i.e., curved shape of the second tilting guide hole 114. In other words, when the second movable part 213 moves in the second support hole 113, the second tilting guide part 214 may be moved along the second tilting guide hole 114 while the second movable part 213 may be rotated on its axis.

As such, when the upper end and the lower end of the movable shaft 210 are connected to the upper end and the lower end of the housing 100, respectively, the linear movement may be stabilized as the first movable part 211 and the second movable part 213 are inserted into the first support hole 111 and the second support hole 113 for support, respectively. The operation of tilting can be done along the edge of each tilting guide hole as the first tilting guide part 212 and the second tilting guide part 214, which are inserted into the first tilting guide hole 112 and the second tilting guide hole 114, and moved, respectively.

As shown in FIG. 9, the housing 100 is provided with a mounting portion 160 crossing the open space. The drive unit 300 is provided on the mounting portion 160.

In the present disclosure, the drive unit 300 is connected to the flap 200 via the connecting link 310. For stable operation of the flap 200, the connecting link 310 and the rotating plate 320 are advantageously connected to the center of the flap 200. Accordingly, the mounting portion 160, to which the drive unit 300 is installed, may be disposed at the center of the open space of the housing 100. Furthermore, the mounting portion 160 is extended to cross the open space of the housing laterally and is connected to the plurality of flaps 200, respectively. As mentioned above, since there is a plurality of flaps 200, a plurality of connecting links 310 and a plurality of rotating plates 320 may also be provided. The plurality of rotating plates 320 and the plurality of connecting links 310 may be respectively connected to the plurality of flaps 200 that may be provided in the mounting portion 160.

The mounting portion 160 is provided with a cover portion 180 that is configured to cover the rotating plate 320 of the drive unit 300 so that the rotating plate 320 and a rotating shaft 340 can be protected from contamination by foreign substances. In addition, since the cover portion 180 is coupled to the mounting portion 160, the rigidity of the mounting portion 160 is secured, thereby preventing any sagging.

The mounting portion 160 is configured to support the drive unit 300 and should stably support the weight of the drive unit 300. When the mounting portion 160 does not support the weight of the drive unit 300 and a slight sag occurs, the respective connecting link 310 and the respective rotating plate 320 of the drive unit 300 may not operate normally. Thus, the respective flap 200 may operate abnormally.

Thereby, the housing 100 is provided with a plurality of support ribs 170 that extend in vertical directions and connect to the mounting portion 160. The support ribs 170 extend in the vertical direction in the open space of the housing 100 and are connected to the upper and the lower ends of the mounting portion 160 to reinforce the rigidity of the mounting portion 160.

The support ribs 170 include a plurality of main ribs 171 that is connected to the upper and lower ends of the mounting portion 160. Furthermore, the support ribs 170 include a plurality of auxiliary ribs 172 connected to the upper end of the mounting portion 160 and arranged along a longitudinal direction of the mounting portion 160.

The main ribs 171 are connected to the upper end of the housing 100 and the upper end of the mounting portion 160. The main ribs 171 are also connected to the lower end of the housing 100 and the lower end of the mounting portion 160. Thus, the rigidity of the mounting portion 160 is reinforced to prevent any distortion. However, when the plurality of main ribs 171 is configured, the air flow passing through the open space of the housing 100 may be disturbed, and the weight may be increased.

Therefore, the auxiliary ribs 172 are configured to connect the upper end of the housing 100 and the upper end of the mounting portion 160, since the auxiliary ribs 172 are relatively lightweight compared to the main ribs 171. Thereby, the total weight of the grille is reduced, and the auxiliary ribs 172 support the mounting portion 160 to prevent sagging of the mounting portion 160.

The thickness, number, and position of the main ribs 171 and the auxiliary ribs 172 may be determined according to the required design rigidity of the mounting portion 160.

The drive unit 300 further includes a rotating shaft 340 rotatably mounted to the mounting portion 160 and coupled to the rotating plate 320. The rotating shaft 340 is rotated by the rotational power received from the driving motor 330.

In an embodiment according to the present disclosure, since a plurality of flaps 200 are utilized, a plurality of rotating plates 320 and a plurality of connecting links 310 of the drive unit 300 are also utilized. Therefore, the plurality of rotating plates 320 is arranged on the mounting portion 160. Furthermore, one rotating shaft 340 is connected to the plurality of rotating plates 320 so that each rotating plate 320 is rotated through the rotation of the rotating shaft 340. The rotating shaft 340 is seated in a rotatable state on the mounting portion 160 to prevent sagging.

The mounting portion 160 includes a seating part 161 on which the rotating plate 320 is rotatably mounted. The connecting link 310 is inserted into the seating part 161, thus allowing the rectilinear movement of the connecting link 310 to be guided.

As shown in FIG. 10, the rotating shaft 340 is rotatably seated on the mounting portion 160. The seating part 161 is configured in a recessed shape so that the rotating plate 320 can be provided. Therefore, the mounting portion 160 may be provided such that the rotating plate 320 is rotatable together with the rotating shaft 340 through the seating part 161. Thus, the positional change, except for the rotating operation, is limited.

In addition, the seating part 161 is configured to extend laterally from the portion where the rotating plate 320 is provided so that the connecting link 310 is inserted. In other words, as the connecting link 310 and the rotating plate 320 are to be interconnected, the seating part 161 is configured such that both the connecting link 310 and the rotating plate 320 are provided. In particular, in the present disclosure, as the rotary plate 320 is rotated and the connecting link 310 is configured to be linearly moved, the seating part 161 is configured so that the rotating plate 320 is rotatably seated upwardly. Also, the connecting link 310 is movable in the front-rear direction from the side of the rotating plate 320 downwardly. Accordingly, the seating portion 161 is configured in a 'L'-shaped groove so that the rotating plate 320 is provided in the vertical direction, the rotating plate 320 and the connecting link 310 can be connected in the horizontal direction, and the connecting link 310 can be moved forward and backward. As mentioned above, since there is a plurality of flaps 200, a plurality of rotating plates 320, and a plurality of connecting links 310, a plurality, i.e., a corresponding number of seating parts 161 may also be used and arranged in a like manner.

In addition, as shown in FIG. 11, the connecting link 310 is provided with a reinforcing rib 311 at a part that is inserted into the seating part 161. The seating part 161 is provided with an extended reinforcing groove 162 that is configured to allow the reinforcing rib 311 to be inserted therein and moved rectilinearly therealong.

Thereby, the reinforcing groove 162 is further provided in the seating part 161 in the direction in which the connecting link 310 moves in a straight line. The reinforcing rib 311, which is inserted into the reinforcing groove 162, is provided in the connecting link 310. As a result, the movement of the connecting link 310, except for the linear motion in the seating part 161, is limited.

The rotating plate 320 of the drive unit 300 is positioned to match the flap 200 in a front-rear direction when tilting so that the flap 200 is opened.

As air flows into the open space of the housing 100, the resistance of each configuration including the drive unit 300 should be reduced. To this end, optimizing the arrangement of the rotating plate 320 and the flap 200 minimizes the resistance of the air flow passing through the open space.

In other words, when the flap 200 is positioned to open the open space, the rotating plate 320 and the flap 200 are provided to match the front and rear directions. Thus, blocking by the rotating plate 320 of the air passing through the flap 200 is minimized, and the air can flow smoothly into the open space. As such, in the open state of the flap 200, as each component of the drive unit 300 is arranged to match the flap 200 in the front-rear direction, air flow through the open space is secured.

The variable grille apparatus having the above-mentioned structure as described herein is capable of controlling the flow rate of air circulated through the grille. Additionally, the variable grille apparatus is capable of improving commercial properties through the advanced opening and closing operation during adjustment of the air flow rate.

In addition, the opening and closing operation of the grille is diversified, such as by sequential or simultaneous operation, so that the sense of operation is enhanced, an exterior design is diversified, and the air flow is secured through an optimization of the structural arrangement.

Although embodiments of the present disclosure are described above in detail, the spirit of the present disclosure is not limited thereto. The embodiments of the present disclosure may be changed and modified in various ways based on the basic concept without departing from the scope of the present disclosure described in the following claims.

What is claimed is:

1. A variable grille apparatus comprising:
    a housing with an open space;
    a flap that is movably mounted to the housing and configured to tilt when moving relative to the housing to open and close the open space of the housing according to a tilting position; and
    a drive unit including
        a connecting link connected to the flap,
        a rotating plate to which the connecting link is connected, and
        a driving motor for providing rotational power to the rotating plate,
    wherein a guide part is provided on the rotating plate and configured to guide movement of the connecting link during a rotation of the rotating plate,
    wherein the drive unit is configured to move a position of the flap when the connecting link moves rectilinearly along the guide part during the rotation of the rotating plate, and
    wherein the flap is mounted to the housing via a movable shaft, wherein guide holes are provided at upper and lower ends of the housing, respectively, allowing opposite ends of the movable shaft to be mounted thereto, respectively, and wherein the guide holes are configured to provide a moving path for the movable shaft.

2. The variable grille apparatus of claim 1, wherein the upper end of the housing is provided with a first support portion and a first connection portion that is disposed above the first support portion, and wherein the guide holes provided at the upper end of the housing comprise a first support hole extending from the first support portion in a front-rear direction and a first tilting guide hole extending from the first connection portion and having a bend in the front-rear direction.

3. The variable grille apparatus of claim 2, wherein a first movable part movably inserted into the first support hole and a first tilting guide part having a backward bend from the first movable part and movably inserted into the first tilting guide hole are provided at the upper end of the movable shaft.

4. The variable grille apparatus of claim 1, wherein the lower end of the housing is provided with a second support portion and a second connection portion that is disposed below the second support portion, wherein the guide holes provided at the lower end of the housing comprise a second support hole extending from the second support portion in a front-rear direction and a second tilting guide hole extending from the second connection portion and having a bend in the front-rear direction.

5. The variable grille apparatus of claim 4, wherein a second movable part is movably inserted into the second support hole and a second tilting guide part having a backward bend from the second movable part and movably inserted into the second tilting guide hole are provided at the lower end of the movable shaft.

6. The variable grille apparatus of claim 1, wherein the housing is provided with a mounting portion crossing the open space, and wherein the drive unit is provided on the mounting portion.

7. The variable grille apparatus of claim 6, wherein the housing is provided with a plurality of support ribs that extend in vertical directions and that connect to the mounting portion.

8. The variable grille apparatus of claim 7, wherein the plurality of support ribs comprises a plurality of main ribs connected to upper and lower ends of the mounting portion and a plurality of auxiliary ribs connected to the upper end of the mounting portion and arranged along a longitudinal direction of the mounting portion.

9. The variable grille apparatus of claim 6, wherein the drive unit further comprises:
    a rotating shaft rotatably mounted to the mounting portion, coupled to the rotating plate, and rotated by the rotational power received from the driving motor.

10. The variable grille apparatus of claim 6, wherein the mounting portion comprises a seating part on which the rotating plate is rotatably mounted, and wherein the connecting link is inserted into the seating part such that the seating part guides a rectilinear movement of the connecting link.

11. The variable grille apparatus of claim 10, wherein the connecting link is provided with a reinforcing rib at a part that is inserted into the seating part, and wherein the seating part is provided with an extended reinforcing groove that is configured to allow the reinforcing rib to be inserted therein and moved rectilinearly therealong.

12. The variable grille apparatus of claim 6, wherein the mounting portion is provided with a cover portion configured to cover the rotating plate of the drive unit.

13. The variable grille apparatus of claim 1, wherein the rotating plate of the drive unit is positioned to match the flap in a front-rear direction when tilting so that the flap is opened.

14. A variable grille apparatus comprising:
    a housing with an open space;

a flap that is movably mounted to the housing and configured to tilt when moving relative to the housing to open and close the open space of the housing according to a tilting position; and a drive unit including
- a connecting link connected to the flap,
- a rotating plate to which the connecting link is connected, and
- a driving motor for providing rotational power to the rotating plate, wherein a guide part is provided on the rotating plate and configured to guide movement of the connecting link during a rotation of the rotating plate, wherein the drive unit is configured to move a position of the flap when the connecting link moves rectilinearly along the guide part during the rotation of the rotating plate, and wherein the guide part comprises a groove extending from outside to an inside along a rotational direction of the rotating plate, and wherein the connecting link comprises a protrusion that is inserted into the guide part and moves along the guide part.

15. The variable grille apparatus of claim 14, wherein an outermost portion of the guide part that is positioned at the rotating plate is open to an outside.

16. A variable grille apparatus comprising:

a housing with an open space;

a flap that is movably mounted to the housing and configured to tilt when moving relative to the housing to open and close the open space of the housing according to a tilting position; and a drive unit including
- a connecting link connected to the flap,
- a rotating plate to which the connecting link is connected, and
- a driving motor for providing rotational power to the rotating plate, wherein a guide part is provided on the rotating plate and configured to guide movement of the connecting link during a rotation of the rotating plate, wherein the drive unit is configured to move a position of the flap when the connecting link moves rectilinearly along the guide part during the rotation of the rotating plate, and wherein the flap, the connecting link, and the rotating plate comprise a plurality of flaps, a plurality of connecting links, and a plurality of rotating plates, respectively, the plurality of flaps, the plurality of connecting links, and the plurality of rotating plates are arranged laterally in the open space of the housing, and each of the plurality of flaps is configured such that panels having a rhombus-shape are arranged in a vertical direction, and the panels of different flaps of the plurality of flaps are arranged to partially overlap in the vertical direction.

* * * * *